No. 792,538. PATENTED JUNE 13, 1905.
R. G. McAULEY.
AUTOMATIC DRAIN APPARATUS.
APPLICATION FILED MAR. 22, 1905.
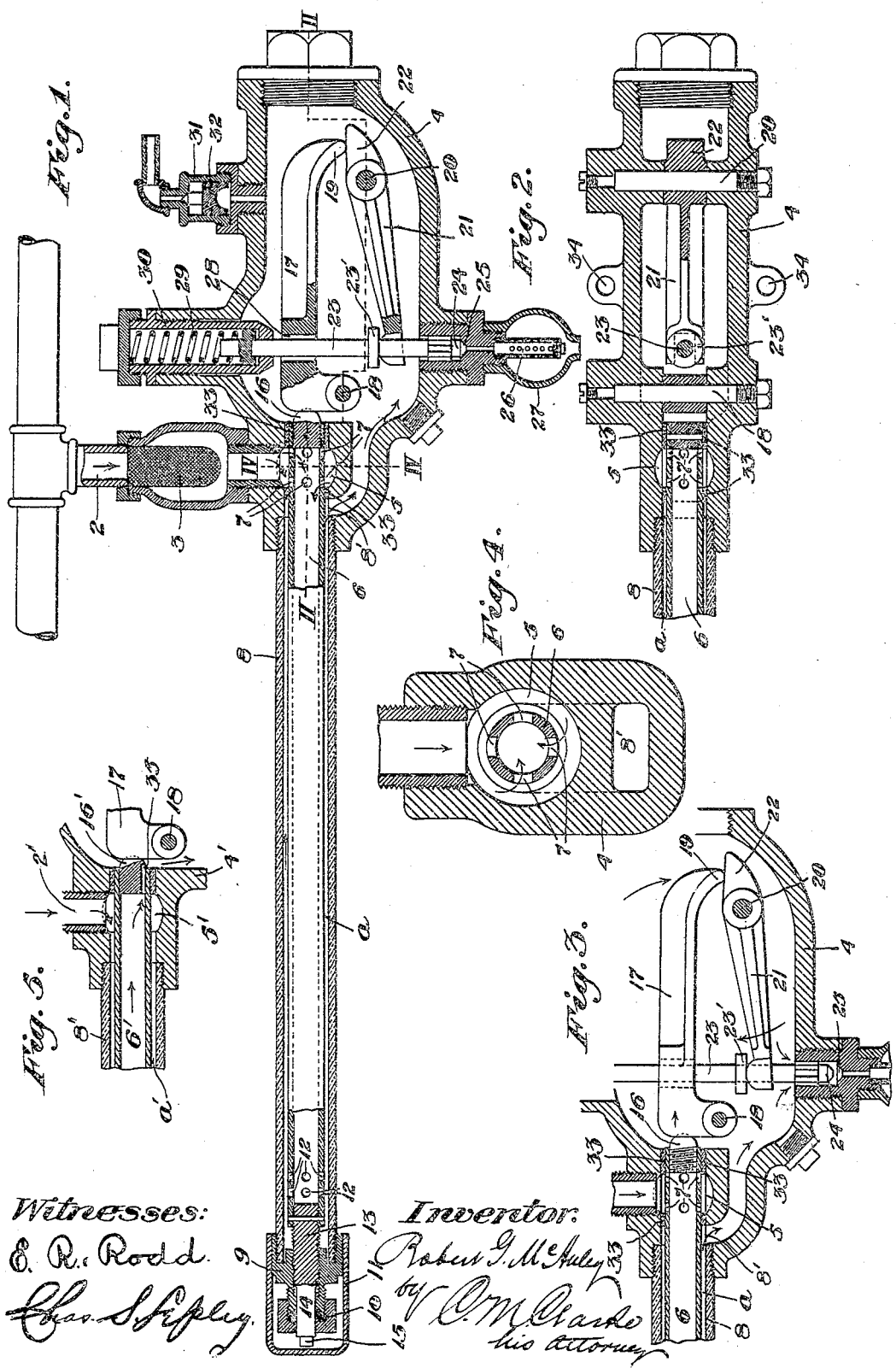
Witnesses:
E. R. Rodd
Chas. S. Shipley
Inventor:
Robert G. McAuley
by O. M. Clarke
his attorney No. 792,538.

Patented June 13, 1905.

UNITED STATES PATENT OFFICE.

ROBERT G. McAULEY, OF PITTSBURG, PENNSYLVANIA.

AUTOMATIC DRAIN APPARATUS.

SPECIFICATION forming part of Letters Patent No. 792,538, dated June 13, 1905.

Application filed March 22, 1905. Serial No. 251,437.

*To all whom it may concern:*

Be it known that I, ROBERT G. McAULEY, a citizen of the United States, residing at Pittsburg, in the county of Allegheny and State of Pennsylvania, have invented certain new and useful Improvements in Automatic Drain Apparatus, of which the following is a specification, reference being had therein to the accompanying drawings, forming part of the specification, in which—

Figure 1 is a longitudinal vertical section though my improved automatic drain apparatus. Fig. 2 is a partial horizontal sectional view indicated by the lines II II of Fig. 1.
Fig. 3 is a partial sectional view similar to Fig. 1, showing the operation of emptying the chamber. Fig. 4 is an enlarged vertical sectional view on the line IV IV of Fig. 1. Fig. 5 is a partial detail view similar to Fig. 1, illustrating a modified arrangement of pipes.

My invention refers to an improved apparatus for collecting and eliminating water of condensation and is particularly designed for the purpose of being used in connection with the steam-pipes of a car-heating system or any other similar heating or steam-conveying plant where the water of condensation accumulates and must be disposed of.

The device is designed for the purpose of operating automatically, depending upon variations in the temperature caused by the varying temperatures of the steam and water, respectively.

The present invention is similar in operation to that shown and described in my prior application, filed March 31, 1904, bearing the serial number 200,892, and refers more particularly to an improved arrangement of the thermostatic construction, adjusting mechanism, lever arrangement, and various other features of improvement, as shall be more fully hereinafter described.

Referring now to the drawings, 2 is an inlet-pipe connected with the steam-pipes of the system desired to be drained, preferably provided with a connected wire-gauze or other suitable straining device 3, adapted to intercept any foreign substance in the course of the steam or water of condensation into the main casing or chamber.

4 is an inclosing case or chamber forming the main body portion of the device, providing an interior cavity of sufficient size to contain an appreciable body of water, as one gallon, with which the pipe 2 or an extension of it is connected, as shown in Fig. 1. The terminal of pipe 2 or an extension thereof is connected with the casing 4 in such a manner as to communicate with a reduced chamber 5, through which projects the inner end of a pipe or tube 6, provided with ports 7, adapted to admit free circulation of the water of condensation from the surrounding chamber 5 into the interior of pipe 6 at whatever position it may assume. Surrounding pipe 6 is an outer pipe 8, tapped into the end of the case, as shown and sufficiently larger than pipe 6 to provide an intervening space *a* for return-flow of the water and steam.
Pipe 8 is provided at its outer end with a rigidly-connected stem-bearing 9, having a stuffing-box 10 and preferably provided with a surrounding coping or shroud 11, removably attached to the head 9 in any suitable manner. The outer end of tube 6 terminates near the outer end of tube 8 and is provided with outlet-openings 12, whereby the water passing outwardly through pipe 6 may escape into the space *a* and return through tube 8, being finally emptied into the collecting-chamber in the interior of case 4 through a communicating port 8'. The terminal end of pipe 6 is provided with an adjusting-screw 13, threaded in the interior of head or coupling 9 and provided with a stem 14, extending outwardly through the stuffing-box and having a turning-terminal 15, by which tube 6 may be accurately set with relation to tube 8. As thus constructed it will be seen that the outer ends of the inner and outer tubes are rigidly connected together. The inner end of tube 6 is provided with an abutting terminal 16, normally bearing against lever 17, pivoted at 18 upon a pin extending across the casing, the lever having a long arm extending forwardly through the chamber and terminating in a downwardly-turned bearing portion 19. Pivoted on cross-pin 20 in a similar manner is a lever 21, against the short arm 22 of which terminal 19 of lever 17 bears, while the long arm of lever 21 extends across underneath lever 17 and engages the valve-stem 23 by means of a lifting abutment or collar 23', against which the terminal, preferably slotted, of lever 21 bears. The lower end of valve-stem 23 is provided with a check-valve 24, seating upon an outlet-valve seat secured underneath the case and providing for exhaust circulation of the water when the valve 24 is raised. I preferably incorporate with the outlet-opening of said valve a muffling device consisting of a perforated stem 26 and a surrounding shell 27, which together act to muffle or quiet the outward circulation of the water of condensation. The stem 23 extends upwardly, a clearance-opening 28 being preferably provided in lever 17 for convenience and is provided with a downwardly-pressing spring 29, secured in any suitable manner, as within an inclosing casing 30, as shown, whereby the spring constantly exerts a downward pressure upon the valve-stem to keep the valve closed. Connected with the upper portion of the case 4 in any suitable manner is a valve-case 31, having a valve 32, adapted to close under internal pressure, but to open on a reduction of internal pressure to admit air to the interior, as will be readily understood. This valve may be constructed in any suitable manner and merely acts as a check, admitting air to facilitate the emptying of the chamber from time to time. As thus constructed the invention is designed to utilize the cooling and heating effect of the water of condensation or steam to open and close the valve 24 periodically to empty the chamber of water when it has become filled and when the temperature of the water has been sufficiently reduced to cause a contraction in the pipe 7. For the purpose of facilitating the operation I prefer to make the tubes 6 and 8 of different materials having different degrees of expansion and contraction under variable heat, and the tube 8 is ordinarily, therefore, made of brass or copper.

The operation is as follows: Water of condensation from the pipe system entering chamber 5 and tube 6 through ports 7 circulates outwardly therethrough and backwardly in the interior of tube 6 and will cause an expansion of tube 8, maintaining the tube 6 outwardly in the position shown in Fig. 1 until the chamber within the case has become filled with water. When sufficiently cool to cause a contraction of tube 8, said tube will force the inner tube inwardly against lever 17, which, acting upon lever 21, will raise the valve, as in Fig. 3, resulting in an outflow of water until the chamber is empty. Immediately upon the entrance of a new supply of hot water or vapor the tube 8 will again elongate, causing the levers and valve to again resume their normal inoperative position under action of spring 29, which position will be maintained until the chamber is again filled. The air-controlling valve 32 will operate automatically to supply sufficient air, as stated, and will reseat itself under internal pressure. By means of the threaded stem 13 it will be seen that the bearing-terminal 16 of tube 6 may be very accurately adjusted with relation to the lever 17, whereby the apparatus may be accurately set to perform its desired function. Steam is prevented from entering the chamber around the operative end of pipe 6 by means of bushings 33, which also serve as centering-bearings for the pipe.

In Fig. 5 I show a modified construction wherein the outgoing water passes directly to space a' from inlet-tube 2' and chamber 5', returning through the interior of inner tube 6', the inner end of tube 6' having a bearing-terminal 16' and an outlet-port 35 opening into the interior chamber. The operation of the apparatus otherwise is the same as just described and merely involves an obvious reversal of the circulation through the inner and outer tubes. The case 4 is provided with lugs 34 at each side, by which it may be supported from underneath the car-body, a supplemental supporting bracket or strap being provided for the extended thermostatic tube, or the device may be supported in any other suitable manner or otherwise incorporated with the pipe system or other steam containing or conveying mechanism with which it is to be used.

As thus constructed my invention is capable of continuous efficient operation. It is extremely simple and cheap in construction, durable, and not liable to get out of order, while being capable of entirely draining the receiving-chamber from time to time without escape of any steam, inasmuch as the thermostatic tube quickly responds to variations in temperature and promptly reseats the valve as soon as the new charge of heated water or vapor commences to enter the chamber.

Changes and variations may be made by the skilled mechanic in the design, construction, or various details of the invention—as, for instance, by substituting a weight for spring 29; but all such changes are to be considered as within the scope of the following claims.

What I claim is—

1. The combination with a chambered body provided with an outlet-opening, of a supply connection, an inner and an outer tube connected together and so arranged in circulating communication with the supply connection as to necessitate a flow therefrom through one of said tubes and a return-flow to the chamber through the other of said tubes, with an outlet-valve, and lever mechanism connected therewith and arranged to be actuated by one of said tubes, substantially as set forth.

2. The combination with a chambered body provided with a valve-controlled outlet, of a supply connection, an inner and an outer tube connected together providing for a return circulation of water of condensation, a lever connected with the valve mechanism adapted to be actuated by one of said tubes, with means for maintaining the valve mechanism closed, substantially as set forth.

3. The combination with a chambered body provided with an inlet connection, an outlet-opening, a valve controlling the outlet-opening, and lever mechanism arranged to unseat the valve; of an inner and an outer tube connected together and so arranged in circulating communication with the inlet connection as to necessitate an independent reverse circulation through the tubes, one of said tubes being in bearing engagement with said lever mechanism, substantially as set forth.

4. The combination with a chamber provided with an inlet connection, an outlet-opening, a valve therefor, and lever mechanism arranged to unseat the valve; of an inner and an outer tube connected together and in circulating communication with the inlet connection, one of said tubes being in bearing engagement with one of said levers, with means for adjusting one of said tubes with relation to the other, substantially as set forth.

5. The combination with a chamber provided with an inlet connection, an outlet-opening, a valve therefor, and lever mechanism arranged to unseat the valve; of an inner and an outer tube connected together and in circulating communication with the inlet connection, one of said tubes being in bearing engagement with one of said levers, and a pressure-spring arranged to normally maintain the outlet-valve seated, substantially as set forth.

6. The combination with a chambered body having an inlet-opening, an outlet-opening, and a valve controlling said outlet-opening; of a lever arranged to unseat said valve, an inner and an outer tube connected together and in reversed circulating communication with said inlet-opening, one of said tubes being arranged to exert pressure upon said lever, due to variations in the length of the outer tube, substantially as set forth.

7. The combination with a chambered body and levers therein arranged to actuate an outlet-valve; of a supply connection, an inner tube communicating therewith and arranged to actuate the levers, and an outer tube secured at one end to said chambered body and connected at the other end with said inner tube, with means for adjusting one of said tubes with relation to the other, substantially as set forth.

8. The combination with a chambered body and levers therein arranged to actuate an outlet-valve; of a supply connection, an inner tube communicating therewith, and arranged to actuate the levers, and an outer tube secured at one end to said chambered body and connected at the other end with said inner tube, with a valve-controlled air-supply opening leading into the chambered body, substantially as set forth.

9. The combination with a chambered body and levers therein arranged to actuate an outlet-valve; of a supply connection, an inner tube communicating therewith and adapted to move operative mechanism, and an outer tube secured at one end to said chambered body and connected at the other end with said inner tube, the inner tube being arranged to discharge at its outer end into the outer tube and the outer tube being arranged to discharge at its inner end into the chamber, substantially as set forth.

10. The combination with a chambered body having an inlet-opening, an outlet-opening, a normally closed valve controlling said outlet-opening, and a lever arranged to unseat said valve; of an outer tube fixedly connected with the chamber, an inner tube connected with said outer tube at its outer end with an intervening space and arranged to actuate said lever, one of said tubes communicating with the inlet-opening at one end and with the other of said tubes at its opposite end, the other of said tubes communicating with the chamber, whereby a return circulation is established, substantially as set forth.

11. The combination with a chambered body having an inlet-opening, an outlet-opening, a normally closed valve controlling said outlet-opening, and a lever arranged to unseat said valve; of an outer tube fixedly connected with the chamber, an inner tube connected with said outer tube at its outer end with an intervening space and arranged to actuate said lever, with a communication between the inlet-opening and one of said tubes adapted to establish an outward circulation through said tube and a return circulation through the other of said tubes into the chamber, substantially as set forth.

In testimony whereof I affix my signature in presence of two witnesses.

ROBERT G. McAULEY.

Witnesses:
   CHAS. S. LEPLEY,
   C. M. CLARKE.

Corrections in Letters Patent No. 792,538.

It is hereby certified that in Letters Patent No. 792,538, granted June 13, 1905, upon the application of Robert G. McAuley, of Pittsburg, Pennsylvania, for an improvement in "Automatic Drain Apparatus," an error appears in the printed specification requiring correction, as follows: On page 2, line 9, the numerals "25" should be inserted after the word "seat"; and that the said Letters Patent should be read with this correction therein that the same may conform to the record of the case in the Patent Office.

Signed and sealed this 27th day of June, A. D., 1905.

[SEAL.]

F. I. ALLEN,
*Commissioner of Patents.*